United States Patent [19]

Daly et al.

[11] Patent Number: 4,784,367
[45] Date of Patent: Nov. 15, 1988

[54] SCAVENGE VALVE FOR A TWO-CYCLE ENGINE

[75] Inventors: Paul D. Daly, Troy; Mark A. Brooks, Sterling Heights; Robert E. Fallis, Milford, all of Mich.

[73] Assignee: Allied Corporation, Morris Township, Morris County, N.J.

[21] Appl. No.: 43,277

[22] Filed: Apr. 27, 1987

[51] Int. Cl.⁴ ............................................. F16K 31/40
[52] U.S. Cl. .................................. 251/30.01; 251/43; 251/33; 123/65 VC
[58] Field of Search .................... 251/30.01, 33, 43; 137/491; 123/65 VC

[56] References Cited

U.S. PATENT DOCUMENTS

| 1,136,715 | 4/1915 | Pitts | 123/65 VC |
| 1,181,793 | 5/1916 | Radovanovic | 123/65 VC |
| 1,665,832 | 4/1928 | Wright | 251/43 X |
| 1,804,865 | 5/1931 | Erickson | 251/43 |
| 2,048,223 | 7/1936 | Scott | 123/65 VC |
| 2,131,958 | 10/1938 | Kadenacy | 123/65 VC |
| 2,431,563 | 11/1947 | Johansson | 123/65 VC |
| 2,466,375 | 4/1949 | Carbon | 251/33 X |
| 2,991,616 | 7/1961 | Miller | 123/65 VC X |
| 3,265,303 | 8/1966 | Harris | 251/43 X |
| 3,312,445 | 4/1967 | Trombatore et al. | 251/30.01 |
| 3,680,305 | 8/1972 | Miller | 123/65 BA |
| 3,815,566 | 7/1974 | Staggs | 123/65 VC X |
| 3,860,073 | 1/1975 | Willms | 251/43 X |

FOREIGN PATENT DOCUMENTS

| 0066613 | 5/1980 | Japan | 123/65 BA |
| 0110818 | 7/1983 | Japan | 123/65 VC |

Primary Examiner—John Rivell
Attorney, Agent, or Firm—Markell Seitzman; Russel C. Wells

[57] ABSTRACT

A method and system, including a valve (32) for controlling the amount of fluid purged from a cylinder (12) of a two-cycle engine prior to the combustion of an air-fuel mixture within the cylinder especially during low demand periods of engine operation. The system including a throttle (26) disposed upstream of an inlet port (14) and controlled to be maintained in an open condition during such intervals. The valve (32), which is adapted to communicate with a scavenge port (30) includes a piston (80) that is movable relative to an aperture (76) in response to a pressure differential created in part by the operation of a cooperating electromagnetic valve (54), such that when the piston is moved to uncover the aperture a predeterminable amount of fluid within the cylinder can be purged therefrom as the cylinder piston is moved through its compression cycle.

13 Claims, 1 Drawing Sheet

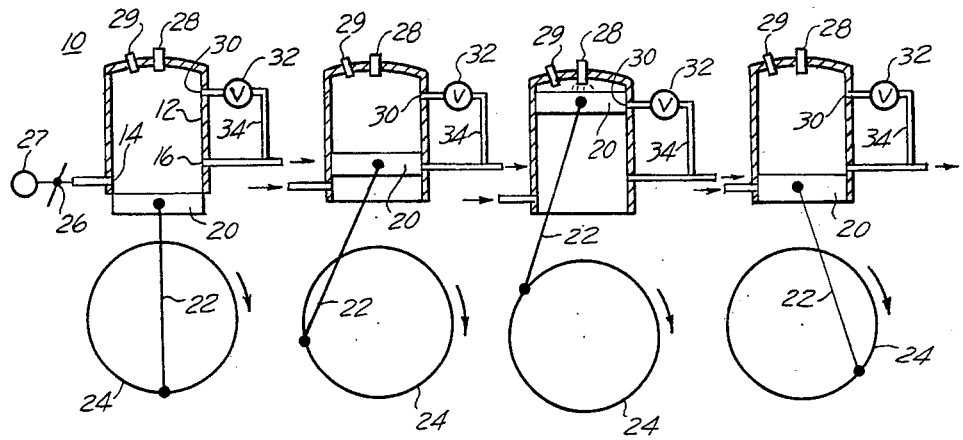
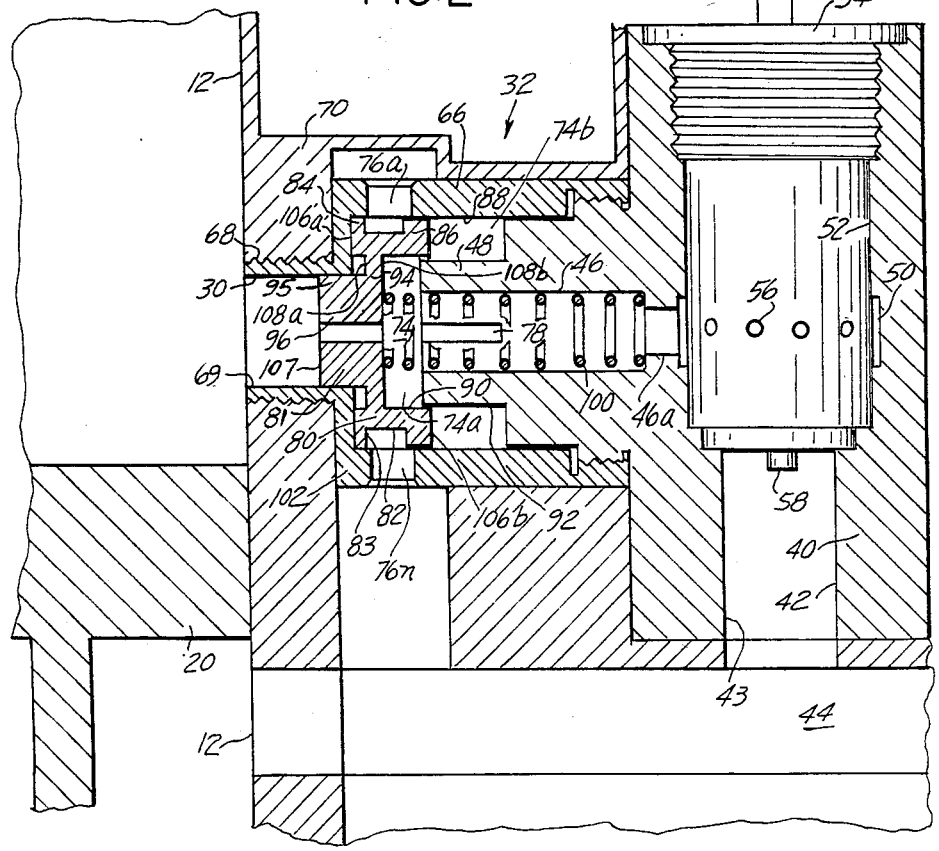

SCAVENGE VALVE FOR A TWO-CYCLE ENGINE

BACKGROUND AND SUMMARY OF INVENTION

The present invention relates to an electromagnetically controlled valve for a two-cycle engine, such valve being adapted to be received within a scavenge port of a cylinder for controlling the operation of the engine and more particularly, a valve which permits the purging of a determinable amount of fluid from the cylinder such that a proper air/fuel ratio is maintained.

Advantages of a two cycle engine are reduced cost and simplicity of construction. These engines, however, do have significant drawbacks. There is always some residual, sometimes significant, amount of burnt gases that remain in the cylinder and mix with a fresh charge of air and fuel. Consequently, the power generated by the two-cycle engine is less than it could be if all of the burnt gases where exhausted. In addition, because of the intake and exhaust port arrangement in a conventional engine, the exhaust gases contain large amounts of hydrocarbons and with regard to a two-cycle carburetted engine, raw gas enters directly into the exhaust system.

Further, the performance of a two-cycle engine, especially at low demand conditions such as idle, cruise or coast conditions, is less than desirable and is characterized by excessive stumble and miss firing. This shortcoming can be seen from the following. During idle conditions, that is, when the throttle is virtually closed only a relative small amount of clean air is permitted to enter the combustion chamber. Subsequently, during ignition, the ratio of air to the exhaust gas within the combustion chamber is not sufficient to encourage combustion. During low demand conditions it is not uncommon for a two-cycle engine to misfire four out of five times.

It is an object of the present invention to improve the performance of a two-cycle engine. A further object of the present invention is to selectively control the amount of exhaust gases residing within the combustion chamber of the two-cycle engine such that proper ignition takes place. A further object of the invention is to selectively purge a predetermined amount of working fluid from the cylinder to regulate the effective air/fuel ratio. A further object is to provide a scavenge valve for regulating the performance of a two-cycle engine.

Accordingly the present invention comprises: a valve for use in controlling the amount of working fluid purged from a cylinder of an engine prior to combustion, comprising: a piston received in and forming part of a chamber in a housing; the housing including an aperture formed about the chamber and an inlet upstream of the aperture, such piston being movable between first and second positions to open and close communication between the aperture and an inlet, the inlet adapted to receive pressurized fluid. The valve further including first means for selectively establishing and terminating communication of the chamber with an outlet adapted to be communicated with pressure lower than a pressure applied to an upstream side of the piston, whereby when communication is established a pressure force differential is created across the piston to urge same downstream, toward the first position, to uncover the apertures to permit flow from the inlet through the aperture; means for balancing the pressure forces acting on upstream and downstream surfaces of the piston, such balancing means effective during intervals when the first means terminates communication of the chamber to the outlet; and means for urging the piston in an upstream direction toward the second position to prohibit flow from the inlet through the aperture.

Many other objects and purposes of the invention will be clear from the following detailed description of the drawings.

BRIEF DESCRIPTION OF THE DRAWINGS

In The Drawings:

FIGS. 1a–1d diagrammatically illustrates the intake and exhaust port action in a two-cycle engine.

FIG. 2 illustrates a cross-sectional view of a scavenge valve for use with a two-cycle engine.

DETAILED DESCRIPTION OF THE DRAWINGS

FIGS. 1a–d illustrate the various modes of operation of a single cylinder of a two-cycle engine. While only one cylinder is shown, the engine may include a plurality of such cylinders. The engine, generally shown as numeral 10, comprises a cylinder 12 having a intake port 14 and an exhaust port 16. Slidably received within the cylinder 12 is a piston 20. The piston 20 is attached by known linkage 22 to the engine crank shaft 24. The exhaust port 16 is communicated to an exhaust system of known variety. Air flow through the intake port 14 is controlled by a throttle generally designated as 26. A blower 27 may optionally be disposed in series with the throttle 26 to pressurize the intake air. Situated at the upper end of the cylinder 12 is a fuel injector 28 and a spark plug 29. Also situated in the upper portion of the cylinder is a scavenge port 30 communicated with a valve such as a scavenge or pilot valve 32, an output of which is communicated to the exhaust system through a passage which is generally designated as 34. In the preferred embodiment of the invention the valve 32 is an electrically activated, pressure balanced scavenge valve.

Prior to describing the present invention, it is illustrative to review the operation of a conventional two-cycle engine. Such conventional two-cycle engines do not include a scavenger port 30 and the following discussion assumes it is not there. With reference to FIG. 1a the piston 20 has been lowered to expose both the intake and the exhaust ports. In this condition a fresh charge of clean air is introduced into the cylinder 12 under the control of the throttle 26 and/or blower 27. FIG. 1b illustrates the beginning of the compression portion of the combustion cycle. The upward motion of the piston 20, as illustrated, closes off the exhaust port and as the crankshaft continues to turn, the piston continues moving upwardly compressing the gases (working fluid) within the cylinder. Fuel is introduced into the cylinder 12 and the spark plug 29 is excited causing combustion as shown in FIG. 1c. FIG. 1d illustrates a portion of the exhaust cycle wherein the piston has been partially lowered within the cylinder 12 to uncover the exhaust port 16 permitting exhaust gas to exit to the exhaust system.

As mentioned above, one of the characteristics of the two-cycle engine is that significant quantities of exhaust gases remain within the cylinder 12. This can readily be seen from FIG. 1a (without regard to blower 27) wherein as the piston 20 is withdrawn to its lowest position a partial vacuum is created within the cylinder.

With the exhaust port communicated to atmospheric pressure, exhaust gases will tend to remain or flow back to the cylinder. The proportion of exhaust gases in the working fluid is even greater during situations of zero throttle or partial throttle wherein smaller amounts of fresh air are permitted to enter the cylinder through the intake port 14. Subsequently, during the compression cycle and as a result of the residual exhaust gas, the air/exhaust gas ratio will not be sufficient to encourage combustion. As mentioned this improper ratio causes the engine to stumble and misfire.

Reference is now made to FIG. 2 which illustrates a detailed cross-sectional view of the scavenge valve 32. The valve 32 comprises a first housing member 40 which includes a stepped bore 42. An exit end 43 of the bore 42 is communicated to the exhaust system generally designated as 44. A transverse bore 46 is fabricated within a hollow, narrow portion or boss 48 of the housing 40. The bore 46 includes a narrow passage 46a which communicates with an annular passage or cut-out 50 having a diameter slightly larger than the diameter of the upper portion 52 of the step bore 42. Situated within the upper portion 52 of the step bore 42 is an electromagnetically actuated valve 54. Preferably this valve is of the normally closed variety. The valve comprises an inlet and outlet means 56 and 58 respectively. As illustrated in FIG. 2 the inlet comprises a plurality of openings situated about the circumference of the valve 54. Such openings are in communication with the enlarged passage or cut-out 50. The specific details of the valve 54 are not pertinent to the present invention, suffice it to say that the electromagnetic valve 54 includes a movable valve means, which is normally closed and when opened permits fluid to flow through the valve 54 from its input 56 to its output 58. Such valve means may include an armature spring biased into a valve seat. Any of the widely known electromagnetic valves used in automotive technology can be used as valve 54.

Threadably received about the boss 48 is a retainer 66. The retainer 66 includes a narrow portion 68 defining an inlet 69 which is threadably received through the walls 70 of the cylinder 12 at the scavenge port 30. The interior of the retainer 66, in cooperation with a narrow portion or boss 48 of the member 40, cooperate to define a chamber 74. The retainer 66 further includes a plurality of openings 76a-n which may communicate the chamber 74 to the exhaust system 44. As will be seen from the description of the operation of the present invention the openings 76 need not be communicated to the exhaust system 44 and may be communicated directly to atmosphere.

Positioned within the chamber 74 is a stepped piston 80. The piston comprises a substantially cup-shaped element 81 having an axially extruding wall 82. The wall 82, on its outside edge, includes a groove 83 which forms two spaced radially extending sections 84 and 86, the ends of which are slidably received within the inner diameter 88 of the retainer 66. With regard to the groove 83, it should be appreciated that such groove is not essential to the operation of the invention. The groove 83 is however, advantageous in that it reduces the surface area of the wall 82 in contact with the inner diameter 88 of the retainer thereby reducing sliding friction. As shown in FIG. 2, the bottom or cross-member 94 is off-set from the sides or faces 106a and b of the sections 84 and 86. In this configuration the sides or faces of sections 84 and 86 define opposingly situated annular pressure receiving surfaces 106a and 106b. It will become apparent that the cross-member 94 need not be recessed from both surfaces 106a and 106b and may be formed parallel with the downstream face 106a.

In either case by virtue of the off-set of the cross-member 94 relative to the downstream face 106b, a cup-shaped pocket is formed wherein the inner diameter 90 of the wall 82 is sized to slidably engage the outer diameter 92 of the boss 48. In addition, the wall 82 is sized such that when the piston 80 is in its right most position, the wall 82 overlaps a portion of the boss 48, the effect of which is to divide the chamber 74 into two parts 74a and 74b. Communication between the two chamber parts 74a and 74b is accomplished by forming a radial slot 78 or plurality thereof in boss 48. The piston 80 is urged to its right most position, i.e. against a shoulder 102 formed in the retainer 66 by a spring 100 which is received within passage 46. The piston 80 further includes a stepped portion 95 extending downstream from the cross-member 94. The portion 95 is sized to slidably engage the walls of the scavenge part 30, alternatively, as shown in FIG. 2, the extending portion 95 is slidably received within the walls 69 of the retainer 66. The downstream end face 107 of the portion defines a circular pressure receiving surface. The area of the cross-member, positioned about the stepped portion 95, defines an annular pressure receiving surface 108a. If the cross-member 94 were not recessed from the end 106a, as shown in FIG. 2, but positioned parallel with the end 106a, the annular surfaces 108a and 106a become one and the same. As will be seen from the discussion below, it is preferable that the area of the end face 107 of the stepped portion 95 be significantly less that remaining frontal area of the pistons i.e. face 106a and surface 108a.

As will be seen from the discussion below, the purposes of providing the above pressure receiving surfaces are: (a) to assist in pressure balancing the piston 80 and (b) to provide a means for increasing the upstream pressure force acting on the piston as a function of the displacement of the piston 80.

While the preferred embodiment of the invention contemplates a pressure responsive piston 80 which is part of a valve 32 communicated to a scavenge port of an engine, the present invention is not so limited. As an example, the piston 80, spring 100, passages 42, 46, apertures 76 can be fabricated as integral parts of the engine. In such a configuration, the engine would also include provision for a valve means, such as the electromagnetic valve 54 for controlling communicating from the downstream side of the piston 80 to the exhaust system.

One of the purposes of the present invention is to control the amount of working fluid (air and exhaust gas) within the cylinder 12 especially during low demand intervals. This is accomplished as follows and may best be understood with reference to the FIGURES. With reference to FIG. 1-c, which illustrates the ignition portion of the combustion cycle, it can be seen that the piston 20 has completely closed off the scavenge port 30 thereby isolating the valve 32 from the effects of combustion. A significant advantage of this configuration is that the hot, corrosive exhaust gases do not flow across the piston 80 and valve 54, the effect of which is to prolong the useful life of such components. In addition, since these components are not continually exposed to exhaust gas an economy is achieved since the components can be fabricated from less expensive materials. During this portion of the cycle the electromagnetic valve 54 had been previously closed in response to signals received from controller 200. As the piston 20 moves through the exhaust portion of the combustion cycle such as illustrated in FIG. 1d and more particularly after the cylinder piston 20 has opened the exhaust port 16, the electromagnetic valve may be commanded to open. As can be seen from FIG. 2 very little flow will occur through the valve 32 since the scavenge port and exhaust port are communicated to approximately the same pressure level.

During the intake portion of the cycle, illustrated in FIG. 1a, a fresh charge of clean air is introduced into the cylinder 14 through the intake port 14. During this portion of the cycle the electromagnetic valve 54 remains in its open state. As the crankshaft continues to turn, the cylinder piston 20 will begin its upward motion as illustrated in FIG. 1-b. The piston 20 will begin to slightly compress the working fluid (air and exhaust gases) within the cylinder creating a pressure differential across the valve 32 which is of such direction and magnitude to urge the piston 80 to the right against the force of the spring 100 as viewed in FIG. 2. Initially the pressure force of the fluid within the cylinder 12 operates only against the exposed circular surface 107. As the piston 80 is moved to the right such that the surface 107 has moved passed the shoulder 102, the surface 108a and 106a become exposed to cylinder pressure, At this point the applied pressure acts upon each of the surfaces 107, 108a and 106a urging the piston 80, with a now greater force, towards the right such that it uncovers the openings 76. With the openings 76 uncovered, the continued upward motion of the piston 20 permits working fluid within the cylinder 12 to be purged therefrom through the openings 76 as the cylinder piston 20 moves upwardly. This condition continues until a predetermined amount of working fluid (proportional to the motion of piston 20) has been removed from the cylinder 12. It is contemplated that during low engine demand periods the throttle 26 will be opened sufficiently to permit a significant amount of clear air to enter the cylinder 12. Depending upon various performance characteristics, the throttle 26, during low demand periods, can be maintained partly or completely open. A blower 27 may optionally be employed to assist in the introduction of fresh air. As such, the incoming fresh air will significantly dilute any remaining exhaust gas in the cylinder 12 such that the working fluid purged from the cylinder, through openings 76 can be communicated directly to the atmosphere and not to the exhaust system as shown in FIG. 2. The position of the throttle can be controlled in a variety of known ways such as with mechanical linkage and/or an actuator such as an electric motor.

Reducing, via purging, the mass of the working fluid trapped in the cylinder 12 prior to ignition, permits combustion to occur with a small regulated amount of fuel at normal air/fuel ratios of less than 20:1. This insures that combustion will occur especially at low demand conditions.

At a predetermined point of the compression cycle the electromagnetic valve 54 is closed terminating communication between the exhaust system 44 and the pressure chamber 74. As the piston 20 continues its upward motion the pressurized working fluid within the cylinder 12, which acts upon the upstream surfaces (106a, 107, 108a), is also communicated to the downstream surfaces (106b and 108b). More particularly, the pressurized fluid is first communicated to surface 108b through the passage 96 and then through the cross-hole or slot 78 formed in the boss 48 into the chamber 74b to the downstream end 106b of the radially extending wall 82. In this condition the same pressure is applied to the upstream and downstream surfaces of the piston 80 and since the surface area of the upstream surfaces is equal to the surface area of the downstream surfaces a pressure force balanced condition is created. In the embodiment of the invention shown in FIG. 2, the area of surfaces 106a and 106b are equal and the sum of the area of surfaces 107 and 108a is equal to the area of surface 108b. Having pressure balanced the piston 80, the spring 100 urges the piston 80 towards the left, closing the openings 76 and prohibits additional purging of the working fluid. The cylinder piston 20 will continue its upward motion covering the scavenge port 30 and shielding the valve 32 from the combusted air/fuel mixture. The amount of fuel input to the engine can be controlled in a known manner to achieve proper engine speed, power output etc.

It should be noted that just prior to opening the electromagnetic valve 54 little or no fluid pressure will act upon its movable internal parts i.e. (armature, closure element etc.) and consequently, such a solenoid valve can be relatively slow in operation and of a low force, low cost design. In addition, during instances when pressure is communicated to the valve 54 the pressure differential is in such a direction to enhance the closing speed and sealing qualities of the valve's internal valving arrangement.

The operation of the electromagnic valve 54 and hence operation of the valve 32 can be controlled by either a timed cycle, a percentage of crank angle or a particular combination of opening and closing crank angles so that engine power is controlled to a desired level.

Further, while the preferred embodiment of the invention does show an electromagnetic valve 54 which selectively opens and closes a passage connected to the exhaust system a mechanically actuated valve can be substituted therefor. Such a mechanical valve can be driven by linkage connected with the crankshaft.

In addition, while the preferred embodiment described the operation of the invention within a fuel injected engine this too is not a requirement of the invention. The fuel injected engine permits a convenient way to independently control the amount of air purged from and the amount of fuel input to the cylinder.

The teachings of the present invention are also applicable for use within carburatted engines. It is true, however, that since the fluid received at the inlet port is a combination of air and fuel that during the purging of this fluid from the cylinder, prior to ignition, raw hydrocarbons will be forced from the cylinder into the atmosphere. It should be appreciated that not all engines are required to operate within the limits of air pollution regulations applicable to automotive engines. An example of unregulated engines are engines used in electrical generators or in marine applications both of which display unsatisfactory performance during periods of low engine demand and wherein such performance can be improved upon incorporation of the present invention.

Many changes and modifications in the above described embodiment of the invention can, of course, be carried out without departing from the scope thereof. Accordingly, that scope is intended to be limited only by the scope of the appended claims.

We claim:

1. A valve for use in controlling the amount of working fluid purged from a cylinder of an engine prior to combustion, comprising:
   a piston received in and forming part of a chamber in a housing; said housing including an aperture formed about said chamber and an inlet upstream of said aperture adapted to receive pressurized fluid;
   said housing including a stepped bore which includes said inlet and a larger diameter portion downstream thereof forming a portion of said chamber, and wherein said piston is step-shaped and received within said stepped bore comprising a cup-shaped member including an axial wall slidably engaging said larger portion and a cross-member spanning said axial wall, and a narrow portion extending upstream of said cross-member and slidably received relative to said inlet, a passage through said extending portion and cross-member and wherein said cross-member is recessed from a downstream end of said axial wall proximate said chamber;
   wherein said housing further includes means for slidably receiving the downstream portion of said axial wall and in cooperation with said piston for subdividing said chamber into a first portion, in communication with a downstream surface of said cross-member, and a second portion in communication with the downstream end of said axial wall, said piston movable between first and second positions to open and close communication between said aperture and an inlet;
   first means for selectively establishing and terminating communication of said chamber with an outlet, whereby when communication is established a pressure force differential is created across said piston to urge same downstream, toward said first position, to uncover said aperture to permit flow from said inlet through said aperture;
   means for balancing the pressure forces acting on upstream and downstream surfaces of said piston, such balancing means effective during intervals when said first means terminates communication of said chamber to said outlet; and
   means for urging said piston in an upstream direction toward said second position to prohibit flow from said inlet through said aperture.

2. The valve as defined in claim 1 wherein said receiving means includes an axially extending boss.

3. The valve as defined in claim 2 wherein a passage extends through said boss in communication with said outlet and wherein said first means includes an electromagnetically responsive valve for controlling communication between said chamber and said outlet.

4. The valve as defined in claim 3 wherein said urging means include a spring for urging said piston in an upstream direction.

5. The valve as defined in claim 4 wherein said boss further includes a second passage for communicating said first and second chamber portions.

6. The valve as defined in claim 5 wherein when said extending portion of said piston is slidably received within said inlet such that said end face of said extending portion can be exposed to pressure received at said inlet, wherein when said piston is moved, in a downstream direction passed said shoulder, said other upstream surfaces of said position are exposed to said received pressure and when said piston has moved into said second position said piston has uncovered said aperture to permit flow from said inlet through said aperture.

7. A valve for use in controlling the amount of working fluid purged from a cylinder of an engine prior to combustion, comprising:
   a piston received in and forming part of a chamber in a housing; said housing including an aperture formed about said chamber and an inlet upstream of said aperture; said piston movable between first and second positions to open and close communication between said aperture and said inlet, said inlet adapted to receive pressurized fluid;
   first means for selectively establishing and terminating communication of said chamber with an outlet whereby when communication is established a pressure force differential is created across said piston to urge same downstream, toward said first position, to uncover said aperture to permit flow from said inlet through said aperture;
   means for balancing the pressure forces acting on upstream and downstream surfaces of said piston, such balancing means effective during intervals when said first means terminates communication of said chamber to said outlet; and
   means for urging said piston in an upstream direction toward said second position to prohibit flow from said inlet through said aperture, wherein said piston further comprises a first member, including an opening defining on an upstream portion thereof a first surface and an axially extending walled member surrounding said first member including an upstream end defining a second surface and a downstream end defining a third pressure receiving surface, and wherein said first member is recessed from said downstream end and wherein when said piston is in said second position said second surface is in contact with a portion of said housing such that the applied pressure does not operate thereon and when said piston is moved in a downstream direction said applied pressure acts upon said first and second surfaces wherein said piston further comprises a pressure receiving fourth surface, opposite to and downstream of said first surface and located on a downstream side of said first member;
   wherein the downstream portion of said walled member is slidably received upon a hollow extending portion of said housing, and wherein said extending portion includes means for communicating fluid from said opening to said third surface.

8. The valve as defined in claim 7 wherein last named means includes a slit formed in said extending portion.

9. The valve as defined in claim 8 wherein said extending portion includes a first passage communicated to an outlet through valve means for controlling the pressure applied to downstream surfaces of said piston.

10. The valve as defined in claim 9 wherein said urging means includes a spring extending from said first passage for urging said piston toward said second position.

11. The valve as defined in claim 10 wherein when said valve means prohibits communication between said first passage and said outlet the pressure force acting upon the downstream surfaces of said piston is permitted to stabilize at the pressure force level applied to upstream surfaces of said piston as fluid flows through said opening and through said slit and acts upon said third and fourth surfaces respectively.

12. The valve as defined in claim 11 wherein said valve means includes a normally closed, electromagnetic valve.

13. The valve as defined in claim 12 wherein the piston includes a groove about the periphery of said walled member separating the walled member into two spaced portions.

* * * * *